United States Patent
Krause et al.

(10) Patent No.: US 9,714,595 B2
(45) Date of Patent: Jul. 25, 2017

(54) STORAGE TANK

(75) Inventors: Michael Krause, Trippstadt (DE);
Rainer Haeberer, Bretten (DE);
Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 731 days.

(21) Appl. No.: 13/144,033

(22) PCT Filed: Nov. 12, 2009

(86) PCT No.: PCT/EP2009/065051
§ 371 (c)(1),
(2), (4) Date: Sep. 28, 2011

(87) PCT Pub. No.: WO2010/078989
PCT Pub. Date: Jul. 15, 2010

(65) Prior Publication Data
US 2012/0006832 A1 Jan. 12, 2012

(30) Foreign Application Priority Data
Jan. 9, 2009 (DE) .................. 10 2009 000 101

(51) Int. Cl.
*B65D 6/40* (2006.01)
*F01N 3/20* (2006.01)

(52) U.S. Cl.
CPC ........ *F01N 3/2066* (2013.01); *F01N 2610/00* (2013.01); *F01N 2610/02* (2013.01); *F01N 2610/1406* (2013.01); *F01N 2610/1466* (2013.01); *Y02T 10/24* (2013.01)

(58) Field of Classification Search
CPC .............. F01N 3/2066; F01N 2610/00; F01N 2610/1406; F01N 2610/1466; F01N 2610/02; Y02T 10/24; F17C 2201/0147
USPC ...... 220/4.12–4.14, 601, 562, 564; 392/441; 60/286, 301, 295
See application file for complete search history.

(56) References Cited

U.S. PATENT DOCUMENTS

| 7,647,767 | B2 | 1/2010 | Osaku et al. | |
| 8,184,964 | B2 * | 5/2012 | Haeberer et al. | 392/441 |
| 2009/0277156 | A1 * | 11/2009 | Hodgson et al. | 60/295 |

FOREIGN PATENT DOCUMENTS

| DE | 10139139 A1 | 6/2003 |
| DE | 10247173 | 4/2004 |
| DE | 102007059635 A1 | 6/2009 |
| WO | 2006/045672 A1 | 5/2006 |
| WO | 2007031467 A1 | 3/2007 |
| WO | 2008138757 A1 | 4/2008 |

OTHER PUBLICATIONS

PCT/EP2009/065051 International Search Report.

* cited by examiner

*Primary Examiner* — Andrew Perreault
(74) *Attorney, Agent, or Firm* — Michael Best & Friedrich LLP

(57) ABSTRACT

The invention relates to a storage tank (12) of a metering system (10) for introducing a reducing agent (32) in an exhaust gas tract of an internal combustion engine. The storage tank (12) comprises at least one opening (50) for mounting components (20, 24) and openings (46, 48, 63) for filling and emptying as well as venting (62). All openings (46, 48, 50, 62) are arranged above a region of the storage tank (12) flooded by the reducing agent (32).

15 Claims, 3 Drawing Sheets

STORAGE TANK

BACKGROUND OF THE INVENTION

The German patent specification DE 101 39 139 A1 relates to a metering system for metering a reducing agent for the after treatment of exhaust gases. The reducing agent particularly relates to urea, respectively a urea-water solution. Said reducing agent is used to reduce the nitrogen oxides contained in the exhaust gas of an internal combustion engine. The apparatus comprises a delivery device for transporting said reducing agent from a storage tank to an exhaust pipe carrying the exhaust gas. In addition, the apparatus comprises an apportioning device for metering the supply of said reducing agent into the exhaust pipe. The delivery device thereby contains a pump and the apportioning device a proportioning valve having an outlet element. The apportioning device is designed such that it can be attached close to or to the exhaust pipe; thus enabling the outlet element to project into said exhaust pipe. Said delivery device is constructed in such a way that it can be accommodated on or inside the storage tank for said reducing agent, and said delivery device and said apportioning device form modules which are separated from each other and are connected to each other by a connecting line.

The German patent specification DE 10 2004 051 746 A1 relates to a reservoir module for a reducing agent and to a metering system. According to this solution, the reservoir module comprises at least one reservoir module housing. A metering system for metering a reducing agent into an exhaust gas system is arranged inside a reservoir chamber of the reservoir module housing.

The German patent specification DE 10 2006 027 487 A1 relates to a vehicle tank for a liquid reducing agent, particularly for a urea solution. The vehicle tank for a liquid, for example aqueous, reducing agent, in particular for a urea solution, for the reduction of nitrogen oxides in the exhaust gas of internal combustion engines has a container wall which is manufactured from plastic material.

If need be, the reducing agent stored in the tank has to be thawed in order to employ a metering system for the metering of urea or an aqueous urea-water solution for the reduction of nitrogen oxides in the exhaust gas of an internal combustion engine and to assure that said metering system functions at low temperatures. For that reason, the tank for storing the reducing agent is as a rule equipped with a heater, particularly an electrically operated heater. Furthermore, the storage tank for receiving the reducing agent includes a level (fill-level) sensor as well as a temperature sensor. An aeration and ventilation of the storage tank occur via a venting system associated with said tank.

The tank bladder of the storage tank normally has the following openings:
an opening for filling the storage tank,
an opening for installing the heating element and the sensors,
in addition an opening for the supply line and return line of the delivery module,
an opening for venting the tank as well as
an opening for emptying the storage tank.

These openings can be positioned at various locations on the storage tank. For reasons of a simplified installation, the module "heating element, fill-level sensor, temperature sensor" is mounted on the bottom thereof, respectively can be dismantled therefrom. The suction line is also usually attached at the lowest point of the tank. Because the ice first thaws around the heater located at the bottom of the tank, it is useful to also carry out the venting of the tank from the bottom side. The openings for emptying the tank are advantageously placed at the deepest point thereof. For this variety of reasons, the openings mentioned above are normally placed on the bottom side of the tank.

This, however, has the disadvantage that all of the above mentioned openings in the tank bladder lie below the fluid level of the reducing agent. Because the reducing agent used, in particular the urea-water solution, is a medium particularly capable of creep, leaks occur more frequently at these openings. This is especially true for plastic tanks, which compared to stainless steel tanks demonstrate instability as a result of external influences, accelerations, ice pressure and thermal stress. Because the aqueous urea solution on the one hand changes immediately to crystals when coming in contact with the air and on the other hand leads to severe corrosion of elastomer plastics and metallic materials, even the smallest leak automatically gives rise to a claim.

SUMMARY OF THE INVENTION

In contrast to conventional solutions according to prior art which are used to date, the present invention provides that all required openings, which are located on the storage tank, are arranged on the top side thereof. This does not mean that the tank shell or tank bladder does not have an opening, respectively gap, from the region of the storage tank flooded by the stored reducing agent. There are also no flanges or connections of contacts provided in the region of the tank shell, respectively tank bladder, flooded by the reducing agent because cracks could occur particularly at long welded seams as a result of the mechanical stresses which take place. According to the solution proposed by the invention, the installation opening for the components arranged inside the tank, the openings required for the supply and return of the delivery module, the fill opening of the storage tank as well as the opening or openings for the venting of said storage tank are entirely provided on the top side of the tank, i.e. not in the region flooded by the reducing agent. In so doing, a direct leakage on the bottom side of the storage tank is prevented.

The solution proposed according to the invention is particularly advantageous with respect to large openings and particularly very advantageous with respect to storage tanks manufactured from plastic material. An ice formation, which occurs when the reducing agent freezes, normally begins on irregularities on the inside of the tank wall in the region of the storage tank which is flooded by the reducing agent. Such irregularities are, for example, openings which are configured on the tank wall for installation purposes. According to the solution proposed by the invention, the tank bladder, i.e. the inside of the tank, in the region inside of the tank which is flooded by the reducing agent is configured without irregularities, in particular without seams or welds. A very smooth design which forms as few irregularities as possible, from which an ice formation can extend, is preferred.

The venting system of the storage tank lies in an advantageous manner in the upper region thereof, i.e. in the region of the storage tank which is not wetted by the reducing agent.

All of the sealing points, for example, for the electrical contacting of sensors and if need be of a heating element, which is to be provided in the interior of the tank, as well as for hydraulic lines, which where applicable are required, are located in the upper ceiling region of the storage tank not flooded by the reducing agent and are for this reason not directly exposed to the reducing agent.

Add-on components, as, for example, an electrically operated feed pump and the like, are advantageously located at the top of the outside of the tank ceiling and are welded or fitted there. In so doing, a weld which might be required lies outside of the region of the tank shell flooded by the reducing agent.

A discharge opening, for example, to let out the reducing agent is particularly not provided at the lowest point of the storage tank. On the contrary, the storage tank is emptied by means of suction from the top side.

The delivery module as, for example, the electrically operated pump, which was previously mentioned, likewise constitutes a heat source and can be positioned directly on the tank ceiling above the openings. Thus, an advantageous arrangement results with respect to the required sealing and the heat flow during thawing.

A tank opening provided on the ceiling side is closed via a plastic cover with threads and a locking nut manufactured from plastic material. The imperviousness of the seal is assured by the use of rubber gaskets.

BRIEF DESCRIPTION OF THE DRAWINGS

Using the drawings, the invention is described below in more detail.

The following are shown.

DETAILED DESCRIPTION

Figure 1:
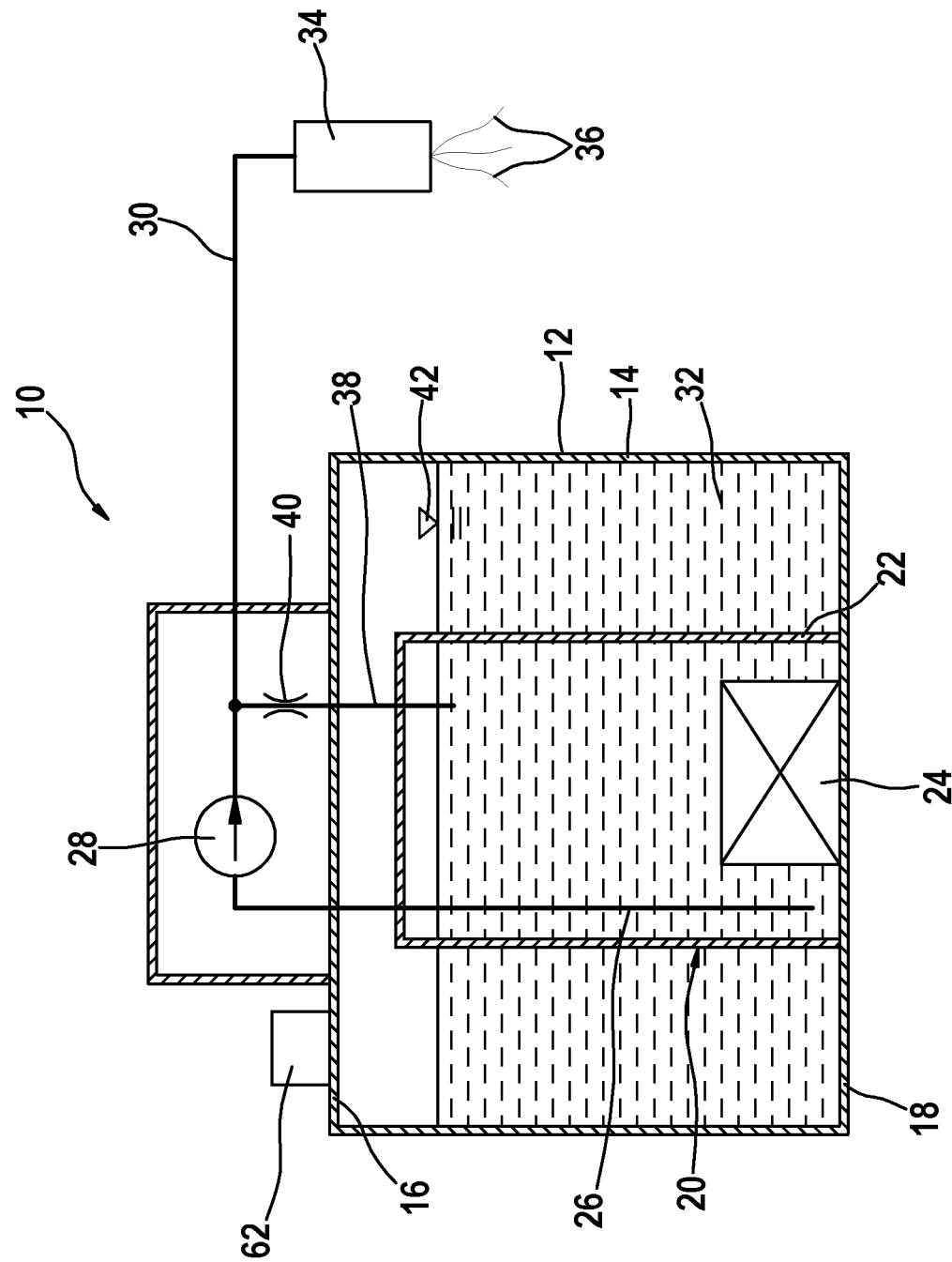
FIG. 1 the components of a metering system for introducing a reducing agent into the exhaust gas tract of an internal combustion engine in schematic depiction, FIG. 2 a storage tank for storing the reducing agent having openings provided on the bottom side, FIG. 3 an option of embodiment of the solution proposed according to the invention, wherein all of the required openings are arranged on the top side of the storage tank, i.e. facing the floor of the vehicle.

The depiction according to FIG. 1 shows the components of a metering system for metering a reducing agent into the exhaust gas tract of an internal combustion engine, respectively the arrangement of said components in the system.

FIG. 1 shows that a metering system 10 comprises a storage tank 12, which is bounded by tank walls 14, a tank ceiling 16 and a tank bottom 18. A spill basin 20 comprising a basin wall 22, which rests on the inside of the tank bottom 18 of the storage tank 12, is arranged inside of said storage tank 12. A heating element 24, which relates to an electrically operated heater, is disposed inside of the spill basin 20 and above said tank bottom 18.

A suction lance 26 extends into the spill basin 20 inside of the storage tank 12. A delivery unit 28 normally designed as an electromotively driven pump transports reducing agent 32 via the suction lance 26 from inside the storage tank 12 into a line 30, which extends on the pressure side of the delivery unit 28 to a metering module 34, which as a rule relates to an injection valve adapted to the characteristics of the reducing agent. Said reducing agent 32 is supplied into the exhaust gas tract, which is not specified in FIG. 1, via the metering module 36 in the form of jets 36.

It can furthermore be seen in the depiction pursuant to FIG. 1 that a return line 38 branches off from the line 30, which extends from the pressure side of the delivery unit 28 to the metering module 34, by virtue of the fact that a throttle point 40 is set up for the pressure regulation. The return line 38 opens out inside of the spill basin 20 in the interior of the storage tank 12. The fluid level inside of said storage tank 12 is denoted with the reference numeral 42, i.e. the region of the tank walls 14 which is wetted on its inside surface by the reducing agent 32. The region inside of said storage tank 12, which lies above said fluid level 42 is on the other hand not wetted by said reducing agent 32. A venting system 62, which is only schematically indicated, is furthermore situated on the top side of the tank ceiling 16.

Figure 2:
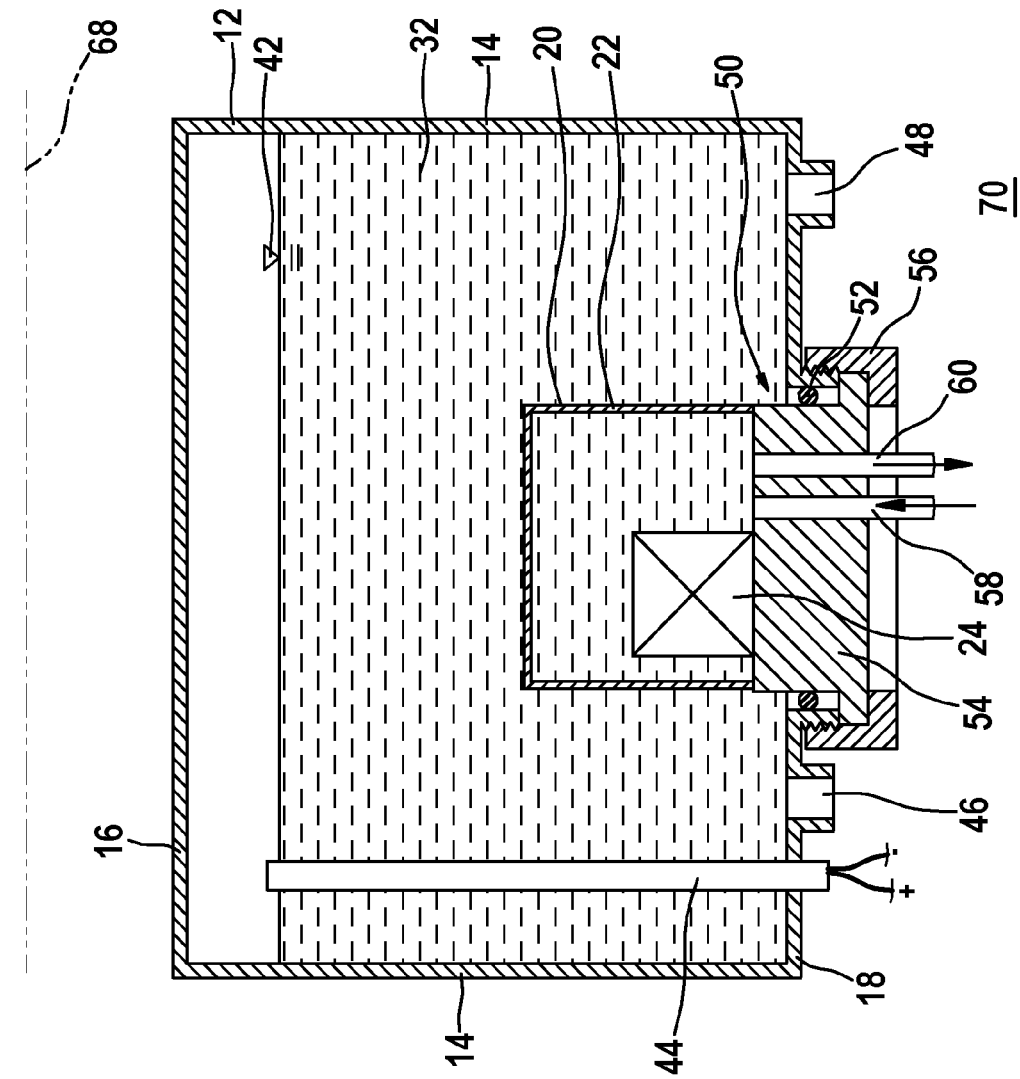

An embodiment of a tank known from prior art can be seen in FIG. 2.

FIG. 2 shows that the storage tank 12 has an installation opening 50 in the region of the tank bottom 18 for the components to be disposed inside of said storage tank, such as the spill basin 20 and the heating element 24. The installation opening 52 is closed by a flange 54, which is fastened to the side of the tank bottom 18 facing the top of the street by means of a clamping nut 56. The flange 54 is environmentally sealed via a gasket 52. In the depiction pursuant to FIG. 2, said flange 54 has a return line 58 as well as a supply line 60 to the unspecified delivery unit 28, respectively to the nozzle module 34 (cf. depiction pursuant to FIG. 1).

It can further be seen in the depiction pursuant to FIG. 2 that starting at the tank bottom a fill-level sensor and a temperature sensor extend through the reducing agent 32 up to the tank ceiling 16. The fill level, i.e. the fluid level 42 inside of the storage tank 12, as well as the temperature of the reducing agent stored therein is acquired using the fill-level, respectively temperature, sensor 44. These data are then converted into electrical signals and further processed.

A filling opening 46 and an emptying opening 48 are furthermore situated in the bottom of the tank 18 on a side of the storage tank 12 which faces the street 70. A supply line 60 and a return line 58 extend through passages in the flange 54, which in turn is sealed off from the installation opening 50 in the tank bottom 18 by means of the gasket 52. Despite said gasket 52 and despite the clamping nut 56, which is tightened to a predefined torque, leaks occur in the region of the tank bottom 18 on the sides which face the street 70.

Figure 3:
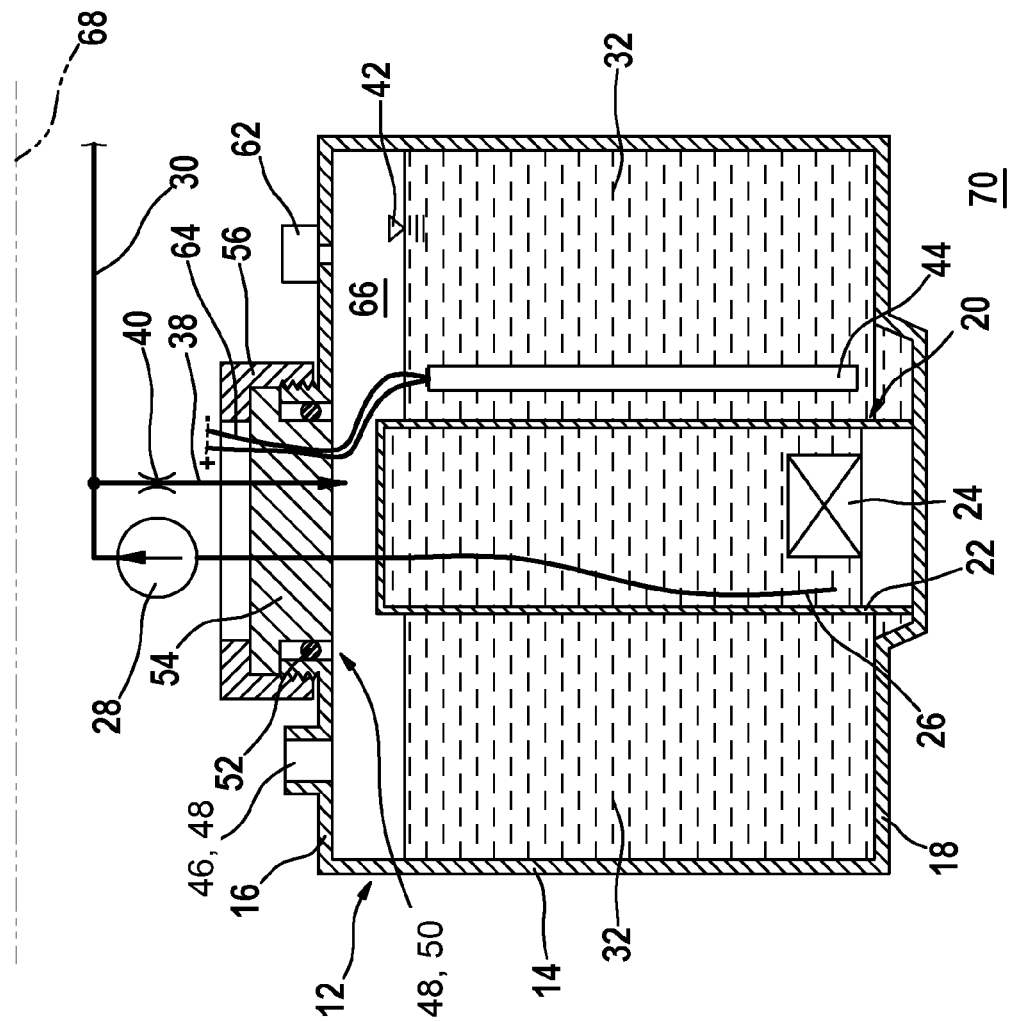

An exemplary embodiment of the solution proposed according to the invention can be seen in the depiction pursuant to FIG. 3. All of the openings, respectively through passages for the supply line, return line, electrical contacts and the like are entirely provided in the region of the storage tank 12 which is not flooded by the reducing agent 32. An air space 66, which extends between the bottom side of the tank ceiling 16 and the fluid level 42, is situated in said region.

It can seen in the depiction pursuant to FIG. 3 that the heating element 24 as well as the spill basin 20 can be mounted inside of the storage tank 12 via the installation opening 50, which is configured in the tank ceiling 16. Said spill basin 20 preferably rests with the lower face side thereof in a recess of the tank bottom 18 corresponding to the diameter thereof. This stabilizes the position of said spill basin 20 and contributes to dampening the sloshing of the reducing agent 32 in the storage tank 12. The suction lance 26 extends into the interior of the spill basin 20, which is bounded by the basin wall 22. A delivery unit 28 preferably configured as an electric pump delivers reducing agent 32 via said suction lance 26 into the line 30, which is connected to a metering module 34 not shown in the depiction pursuant to FIG. 3.

According to the solution proposed by the invention pursuant to FIG. 3, the tank bottom 18 is a component and does not have any openings, which face the street 70. On the contrary, all of the openings are installed in the region of the storage tank 12 which is not flooded by the reducing agent 32. The storage tank 12 is preferably manufactured as a plastic component by a blow molding process and is consequently seamless in design. In particular, there are not any seams, on which cracks could form due to the mechanical stress under temperature fluctuations, running in the region flooded by the reducing agent 32.

According to the solution proposed by the invention, the filling opening is integrated into the tank ceiling 16 of the storage tank 12 pursuant to the depiction in FIG. 3. In addition, an opening for venting 62 is provided on the exterior of said tank ceiling 16. The installation opening 50, which is closed by the flange 54 in the depiction pursuant to FIG. 3, extends through the opening for venting 62 mentioned above. Said flange 54 is environmentally sealed via a seal designed as an o-ring and is fixed on the edge of said installation opening via the clamping nut 56. Said flange 54 in turn comprises a through passage for the suction lance 26, which in this embodiment variant depicts the supply line 60 as well as a through passage for the return line 38, cf. position 60 in FIG. 2. Said flange 54 is additionally equipped with a through passage for electrical contacting 64, by means of which a fill-level and temperature sensor 44 extending in the vertical direction is electrically contacted. This sensor 44 extends longitudinally parallel to the basin wall 22 of the spill basin 20, which is situated substantially in the center of the storage tank 12 which stores the reducing agent 32.

It can be seen in the depiction pursuant to FIG. 3 that the tank ceiling 16 or the clamping nut 56 in the flange 54 respectively faces the vehicle floor with the topside thereof, while the tank bottom 18—configured without any openings—faces the street. By means of the solution proposed by the invention, pools of reducing agent 32, which due to the creep characteristics thereof could escape out of the openings depicted in FIG. 2 on the bottom side of the storage tank, are prevented.

The solution proposed according to the invention can advantageously be used where tank bladders of storage tanks 12 have large openings and especially in the case of tanks manufactured from plastic material. If the tank walls 14 are manufactured from metallic materials, connections formed in a materially joined fashion, which, for example, are produced by way of welding, are avoided as far as possible in the region of the tank which remains below the fluid level 42 of the reducing agent 32, i.e. in the flooded region of said tank. This is important because cracks can occur especially in long welding seams as a result of stresses.

The invention claimed is:

1. A storage tank (12) of a metering system (10) for introducing a reducing agent (32) in an exhaust gas tract of an internal combustion engine, the storage tank (12) bounded by tank walls (14), a tank ceiling (16) and a tank bottom (18) and comprising at least one opening (50) for mounting a spill basin (20) and/or a heating element (24) closed by a flange (54), an opening for filling and emptying (46, 48), and a venting opening (62), thereby characterized in that the spill basin (20) rests on an inside of the tank bottom (18) and that all of the openings (46, 48, 50, 62) are located in a tank ceiling (16) above a region of said storage tank (12) flooded by the reducing agent (32) above a fluid level (42) of the reducing agent (32) and that openings for a supply line (38, 60) and a return line (58) are in the flange (54).

2. The storage tank (12) according to claim 1, characterized in that the storage tank (12) is manufactured from plastic material.

3. The storage tank (12) according to claim 1, characterized in that the tank ceiling (16) of the storage tank (12) faces a vehicle floor (68).

4. The storage tank (12) according to claim 1, characterized in that electrical contacts (64) pass through the tank ceiling or the flange.

5. The storage tank (12) according to claim 2, characterized in that said tank is configured without seams or welds in the section flooded by the reducing agent (32).

6. The storage tank (12) according to claim 1, characterized in that a venting (62) is arranged in the region of the tank ceiling which is in the section of the storage tank (12) not flooded by the reducing agent (32).

7. The storage tank (12) according to claim 1, characterized in that electrical contacts (64) of components (20, 24) as well as hydraulic lines in the upper region of the storage tank (12) are sealed in the section of the storage tank (12) not flooded by the reducing agent (32).

8. The storage tank (12) according to claim 1, characterized in that add-on components (28) are arranged on the tank ceiling (16) and the attachments thereof are located on the exterior of the tank ceiling (16) within the region of the storage tank not flooded by the reducing agent (32).

9. The storage tank (12) according to claim 1, characterized in that a delivery unit (28) for transporting the reducing agent (32) out of the inside of the storage tank (12) is positioned on the tank ceiling (16) above the openings (46, 48, 50, 62).

10. The storage tank (12) according to claim 1, characterized in that openings (46, 48, 50, 62) configured on the tank ceiling (16) are closed via plastic covers.

11. The storage tank (12) according to claim 5, characterized in that a venting (62) is arranged in the region of the tank ceiling which is in the section of the storage tank (12) not flooded by the reducing agent (32).

12. The storage tank (12) according to claim 11, characterized in that electrical contacts (64) of components (20, 24) as well as hydraulic lines in the upper region of the storage tank (12) are sealed in the section of the storage tank (12) not flooded by the reducing agent (32).

13. The storage tank (12) according to claim 12, characterized in that add-on components (28) are arranged on the tank ceiling (16) and the attachments thereof are located on the exterior of the tank ceiling (16) within the region of the storage tank not flooded by the reducing agent (32).

14. The storage tank (12) according to claim 1, characterized in that a delivery unit (28) for transporting the reducing agent (32) out of the inside of the storage tank (12) is positioned on the tank ceiling (16) above the openings (46, 48, 50, 62).

15. The storage tank (12) according to claim 1, characterized in that electrical contacts (64) of components (20, 24) as well as hydraulic lines in the upper region of the storage tank (12) are sealed in the section of the storage tank (12) not flooded by the reducing agent (32).

* * * * *